United States Patent [19]

Vayda

[11] Patent Number: 4,805,738
[45] Date of Patent: Feb. 21, 1989

[54] TIMED CYCLE SINGLE STOP SHOPPING FACILITY

[76] Inventor: Mark Vayda, 8380 Greensboro Dr., Suite 917, McLean, Va. 22102

[21] Appl. No.: 87,288
[22] Filed: Aug. 20, 1987
[51] Int. Cl.⁴ ............................................. E04H 3/04
[52] U.S. Cl. ...................................... 186/36; 186/53; 186/55; 52/66
[58] Field of Search .................. 186/35, 36, 41, 49, 186/52, 53, 55, 56, 57, 58, 69; 235/383; 108/20, 21, 22, 139; 52/65, 66; 272/43, 39

[56] References Cited

U.S. PATENT DOCUMENTS

| | | |
|---|---|---|
| 1,677,267 | 7/1928 | Bristol . |
| 1,751,199 | 3/1930 | Grant . |
| 1,795,365 | 3/1931 | Hackl ..................................... 186/53 |
| 2,649,930 | 8/1953 | Purdy . |
| 2,957,548 | 10/1960 | Davy ..................................... 186/53 |
| 3,027,022 | 3/1962 | Peras ..................................... 414/134 |
| 3,039,565 | 6/1962 | Egner ..................................... 186/57 |
| 3,304,416 | 2/1967 | Wolf . |
| 3,348,634 | 10/1967 | Hitchins . |
| 3,354,707 | 11/1967 | Born . |
| 3,504,245 | 3/1970 | Cotton et al. ........................ 318/569 |
| 3,519,151 | 7/1970 | Lemelson ............................. 414/273 |
| 3,536,109 | 10/1970 | Ginsburgh et al. . |
| 3,610,554 | 10/1971 | Schwarz et al. . |
| 3,636,975 | 1/1972 | Kirkman et al. ..................... 52/65 X |
| 3,647,026 | 3/1972 | Alexander et al. . |
| 3,774,723 | 11/1973 | Johnston . |
| 4,073,368 | 2/1978 | Mustapick . |
| 4,111,282 | 9/1978 | Vayda ................................... 186/36 |
| 4,169,521 | 10/1979 | Vayda ................................... 186/36 |
| 4,189,031 | 2/1980 | Vayda ................................... 180/36 |
| 4,237,598 | 12/1980 | Williamson ...................... 364/478 X |
| 4,638,312 | 1/1987 | Quinn et al. ...................... 186/39 X |

Primary Examiner—F. J. Bartuska
Attorney, Agent, or Firm—Pollock, Vande Sande and Priddy

[57] ABSTRACT

A single stop shopping facility that comprises a plurality of customer stations, each including a vehicle parking space, which are arranged around the exterior of a circular building containing goods for sale. The customer stations and building rotate relative to one another. The building includes a loading station for delivering selected goods ordered at the customer stations. Fuel dispensing stations located around the exterior of the building permit a customer, located in a vehicle parking space, to receive a selected quantity of fuel as the relative rotation proceeds. The walls of the building support merchandise display sections which are viewable by persons located at the customer stations, the displays being cyclically exposed to the parked vehicles as a result of the relative rotation, permitting the selection and payment for merchandise as the relative rotation continues. After elapse of a predetermined time interval, the relative rotation positions the loading station adjacent to the vehicle from which merchandise was ordered, for delivery of the merchandise to that vehicle.

21 Claims, 5 Drawing Sheets

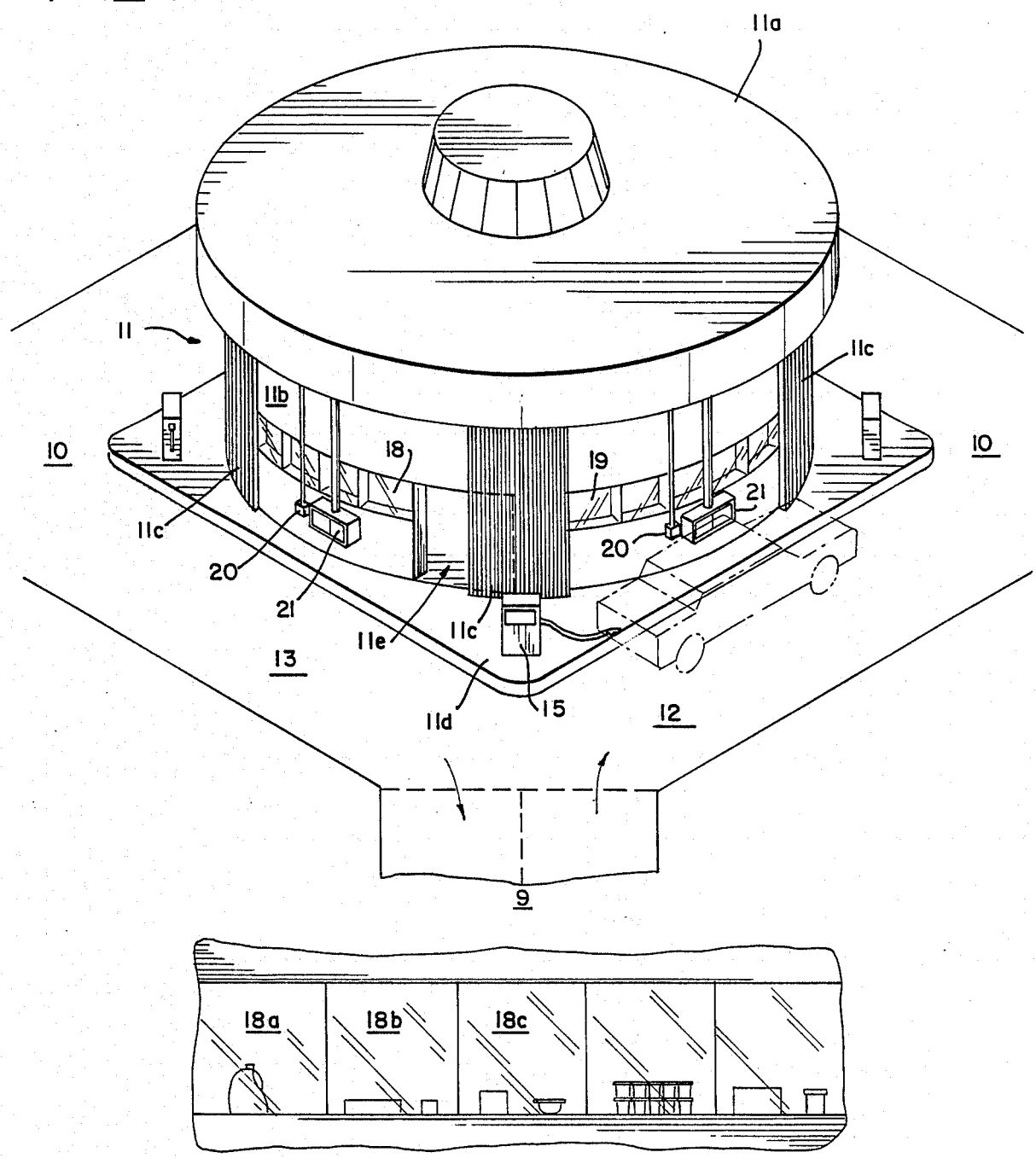

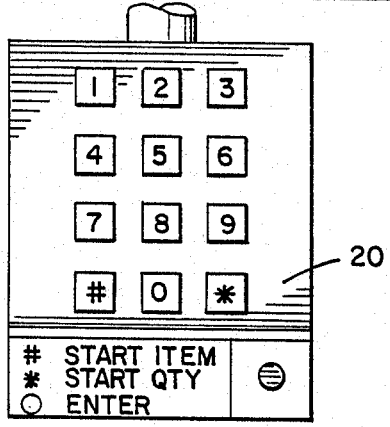
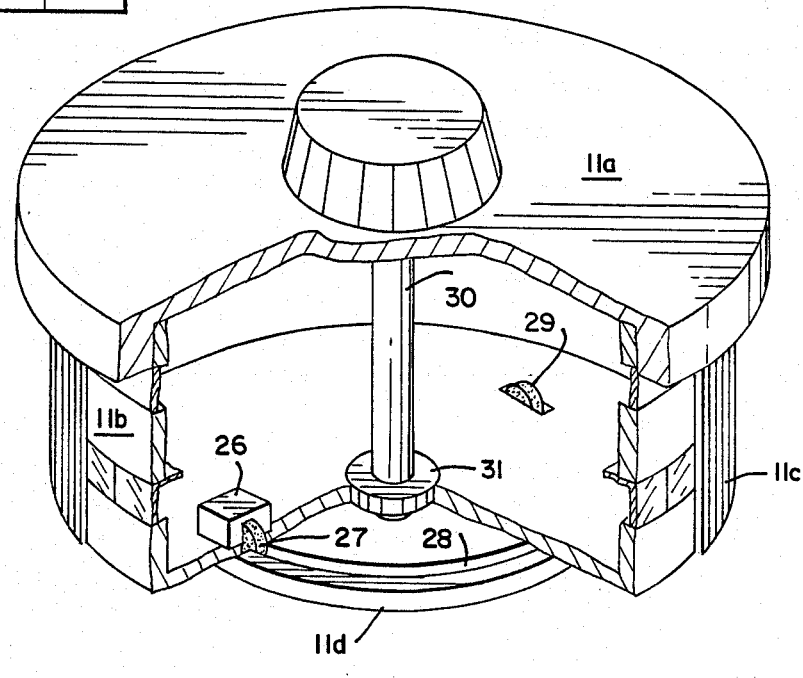

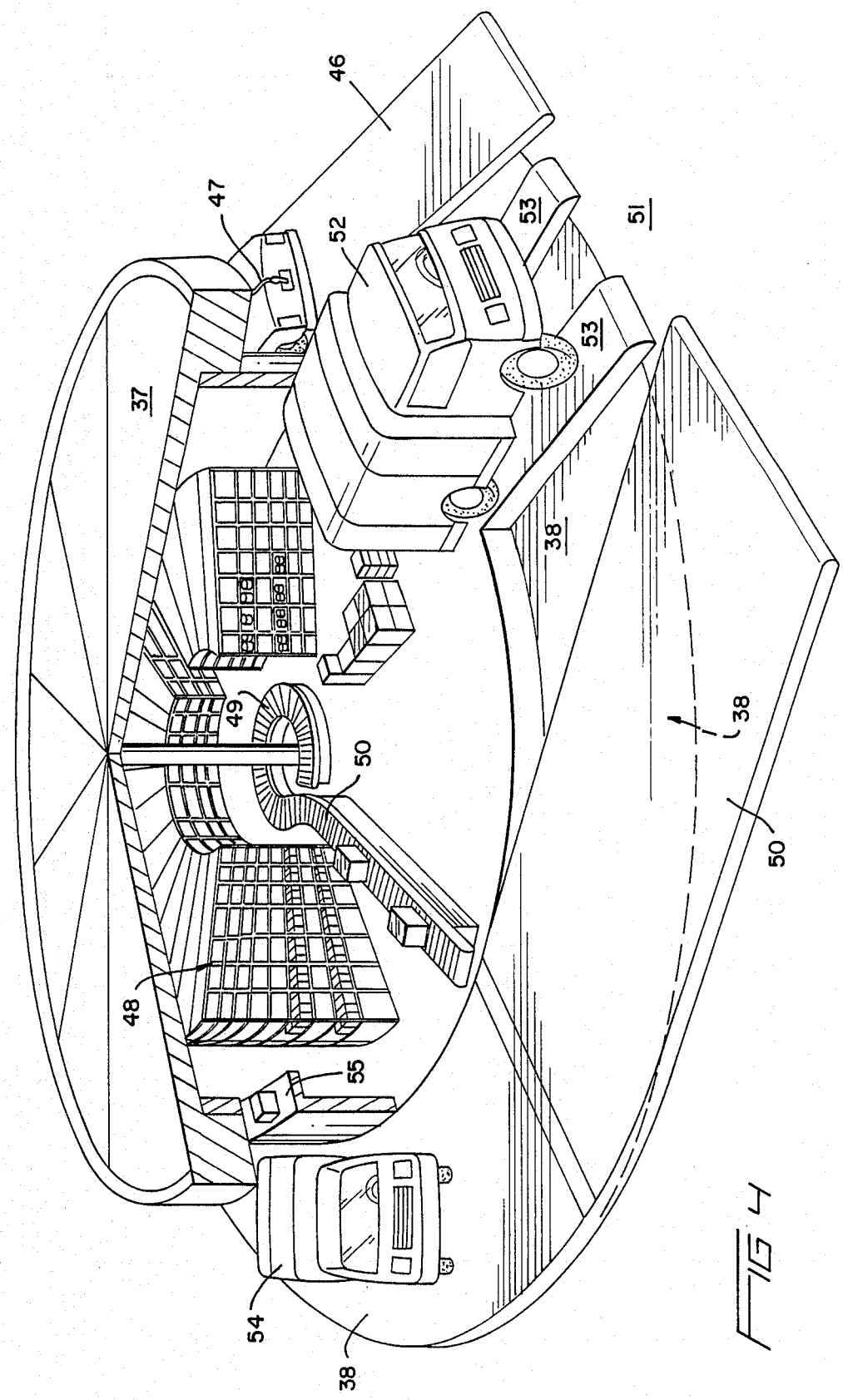

TIMED CYCLE SINGLE STOP SHOPPING FACILITY

BACKGROUND OF THE INVENTION

The present invention relates to facilities for vending consumer products, services and automobile fuels. Specifically, a retail facility is described which enhances the shopper's ease of purchasing consumer products and services and automobile fuel from a single facility.

In my previous patents, U.S. Pat. Nos. 4,111,282; 4,189,031; and 4,169,521, I described a drive-in, single stop, nonautomated shopping facility capable of vending numerous retail products, services and fuel to a customer while the customer remained at a fixed purchase station, e.g., sitting within a parked automobile. The drive-in facility of the aforementioned patents permitted, during the fueling of an automobile, the vending of all weekly purchase requirements for the average household, such as groceries, beverages, bank service, bill paying, laundry/dry cleaning, fast food, and other commodities and services (hereinafter referred to individually and collectively as "merchandise"). The type of merchandise offered, larger order size, volume of customers, low percent labor, store attractiveness, and low shrinkage/losses, improved the total profitability of the drive-in shopping facility beyond those facilities which merely sold fuel or some other single product or service, or which required the individual to depart from his automobile to select and pay for other commodities.

The shopping facility described in these earlier patents, and the method of vending which they implemented, was so successful with the consuming public that the prior nonautomated facility could not handle, on a continuous basis, the number of customers who sought to purchase both gasoline and household commodities. Lines would occasionally form in the street leading to the facility, causing traffic problems and complaints from the responsible traffic officials. Also, during peak operating hours, the customers using the nonautomated facility of my prior patents encountered delays as a result of the fuel attendant's inability to man the gasoline pumps as well as make the required transfer of goods from the facility to the automobile.

Thus, the market success of the nonautomated facility described in these earlier patents created bottlenecks which interfered with customer throughput. In time, these bottlenecks, which were anticipated to a lesser degree, became so severe that they discouraged patronization of the facility by customers. The present invention obviates these problems.

SUMMARY OF THE INVENTION

It is a primary object of this invention to provide an improved facility that can be used by a vehicle operator to select, order, pay for and receive merchandise, i.e., services, commodities, and fuel, in a fixed amount of time which I refer to as a "timed purchase cycle".

It is a more specific object of this invention to increase throughput in a single stop shopping facility, which vends both automotive fuel and consumer goods and services, by use of time-cycle purchasing arrangements.

These and other objects of the invention are provided by the examples of the improved facility which will be described hereinafter. Each of the single stop shopping facilities of the present invention incorporates a plurality of ordering devices which are used by customers at their respective "fixed purchase stations". The said ordering devices may be fixed in position adjacent to the fixed purchase stations, or they may take the form of portable devices which are located within the vehicles of customers that patronize the facility. The fixed purchase stations are arranged circumferentially with respect to the exterior of a circular building, the building containing merchandise for sale. The circular building further includes at least one loading station for the delivery of merchandise ordered by customers. A plurality of fuel dispensing hoses are located around the circumference of the circular building, and permit a customer, situated in or near his/her vehicle at the respective fixed purchase station, to receive a selected quantity of fuel. Also located around the walls of the building are a plurality of display sections, all of which are viewable during the fixed time cycle by any customer at any one of the fixed purchase stations. A customer situated in or near a vehicle parked in an appropriate parking space is capable of ordering and paying for any merchandise, whether or not displayed in the said display sections.

To expedite the ordering, paying for and receipt of merchandise, means are provided for imparting relative rotation between the circular building and the fixed purchase stations that substantially surround said building. Each of the displays is exposed to the customers located at their respective fixed purchase stations as the aforementioned relative rotation proceeds. Customer selection of, and payment for, merchandise shown by the displays occurs as the relative rotation proceeds. Further, the relative motion causes a loading station in the circular building to be positioned next to the customer or his vehicle at the conclusion of the fixed purchase time cycle for delivery of the customer's selected and paid-for merchandise.

In one embodiment of the invention, the fixed purchase stations are stationary and the circular building rotates relative to said stations to provide the desired relative motion, the building having the aforementioned merchandise display located around its circumference. As a customer remains in or near his or her vehicle, the display sections pass by the vehicle at a rate sufficiently slow to permit him or her to view the display and to select consumer merchandise for purchase by use of the ordering device at his/her fixed purchaser station. At the conclusion of the timed purchase cycle, that is characteristic of all the embodiments of the present invention and during which all of the customer's selections are made, the loading station arrives at a proper position relative to the fixed purchase station, i.e., parking space, to permit purchased products to be transferred from the facility to the customer's vehicle.

In another embodiment of the invention, a track containing a number of fixed purchase stations, i.e., parking spaces, is provided around a stationary circular building having a rotating roof, and the track rotates around the stationary portion of the building. The fueling hoses in this particular embodiment are connected through a central hub at the rotating roof of the building, which hub is coaxial with the building and with the center of rotation of the track. Thus, the fueling hoses rotate with each vehicle as the vehicle's fixed purchase station progresses around the building circumference. The ordering devices are fixed to the rotating roof and/or the track, and progress with the vehicle on the track, permitting customer purchases to be selected and payment made therefor as the customer progresses through the "timed purchase cycle".

DESCRIPTION OF THE FIGURES

FIG. 1A is a perspective view of one embodiment of the present invention wherein relative motion between the shopping facility and each customer is provided by rotating a circular building structure while the customer's vehicle remains stationary.

FIG. 1B is a front view of a display case which is visible to a customer using the shopping facility.

FIG. 1C is an enlarged view of the display console available to each customer illustrating the merchandise offered to and purchased by the customer.

FIG. 1D illustrates a computer ordering device used at the customer's ordering station to select purchases.

FIG. 3 is a section view of a support and motor drive structure for imparting rotary motion to the building.

FIG. 4 illustrates another embodiment of the invention wherein relative motion is imparted between the shopping facility and customer by the rotation of a track on which the customer's vehicle is positioned.

DESCRIPTION OF THE PREFERRED EMBODIMENT

Figure 2:
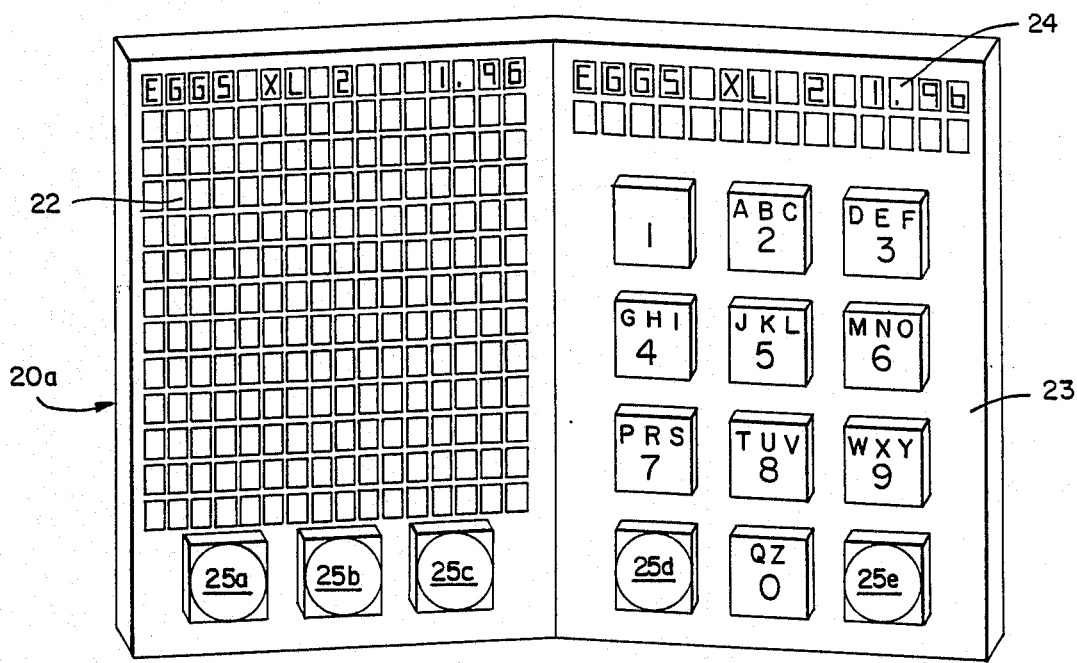
FIG. 2 illustrates a portable computer ordering device.

Referring now to FIG. 1A, there is shown a perspective of an embodiment of a one-stop convenience shopping center in accordance with the present invention. The convenience shopping center comprises a circular building 11 which rotates at a rate of one revolution approximately every three to five minutes. The rotating building 11 includes a roof 11a which remains fixed, and an exterior wall surface 11b that rotates within fixed stanchions 11c. The stationary roof and stanchions of the building 11 are supported on a fixed cement slab support 11d shown in a rectangular configuration. The slab 11d may be hexagonal or otherwise multi-faceted, to facilitate the provision of more than four vehicle positions around the circumference of the building 11.

Around the circumference of the circular building 11 and its cement slab 11d are located a plurality of fixed purchase stations, i.e., parking spaces, two of which 12 and 13, are shown in FIG. 1A. While FIG. 1A depicts an arrangement wherein each vehicle is so parked that its length is tangential to the building, the parking spaces can be so arranged that each vehicle parks radially, or at a desired angular orientation, relative to the circular building to increase the number of vehicles, i.e., customers, that can be served at any given time. Associated with each of the fixed purchase stations is a fueling station 15, display monitor 21, and a computer ordering device, hereinafter referred to as a COD, which can be a fixed unit of the type indicated at 20. Entrance and exit to the facility is made through one or more common entrances/exits 9 and 10.

The rotating circular wall surface 11b has a plurality of merchandise displays thereon, two of which, 18 and 19, are identified in FIG. 1A. Referring to FIG. 1B, an enlarged view of a display 18 is shown, which includes subsections 18a, 18b, 18c, etc. These displays show some of the products which are available for purchase by customers. As the displays rotate with the building wall 11b, each customer views each display during a timed purchase cycle. The customer may use COD 20 to order any items, whether or not displayed, in any quantity, including fuel, while the customer remains at his fixed purchase station, e.g., in or near his vehicle. All purchases are consolidated into a single bill.

At the conclusion of the timed purchase cycle, an opening 11e in the wall 11b is positioned adjacent to a customer's fixed purchase station to facilitate the loading of purchased goods into the customer's vehicle. The building includes another similar opening, not shown, which is angularly displaced from opening 11e by approximately 45°-60°, for use in replenishing comparatively heavy inventory items. Payment for the goods may be by any appropriate means, including entry of an appropriate credit card into a credit card reader, or by use of the COD 20.

The customer may, before arrival at the facility, prepare his order in advance by use of a portable COD (to be described by reference to FIG. 2) or by other means, e.g., telephone communication, sense marked paper, magnetic card, or punch card. The pre-prepared order can then be entered for processing when the customer arrives at the facility, or prior to the customer's arrival at the facility by remote transmission via telephone or radio transmitter.

Referring now to FIG. 1C, there is shown an enlarged view of the split screen monitor 21, located at each ordering position. The left screen provides the customer with a list of items for sale, the price per item, and other descriptive material in order to facilitate a purchase. The right-hand portion of the split screen illustrates those items which have been ordered by the customer and which will be delivered to him when the loading station of the building arrives at the position used for supplying ordered goods to the customer. A third screen (not shown) can also be provided for displaying promotional information and/or video entertainment for the customer and/or the passengers in his vehicle.

COD 20 is shown more particularly in FIG. 1D. It comprises a keyboard operated terminal which conveys an item number, e.g., by hard wiring, to a computer within the facility for each selection made by the customer, and the quantity of the selection. Instead of using a keyboard, COD 20 can be voice activated, i.e., item and quantity requests can be presented orally, and deciphered by a voice decoder into appropriate data signals which are temporarily stored in the COD, whereafter said data signals are dumped from the COD into the facility computer for processing. Equipment within the building 11, with or without active participation by facility personnel, then assembles the order for delivery to the customer.

The COD can also take the form of a portable, hand-held device 20a (FIG. 2) which is purchased or leased by the customer to prepare and store an order prior to the customer's arrival at the single stop shopping facility of the present invention. Such a portable COD 20a may comprise a storage memory containing three banks of information: (a) the customer's various credit account numbers entered by the customer and permanently stored for use in paying for purchases by entry of a memorized identification number; (b) a listing of all items carried and services offered by the shopping facility, which may be loaded and/or updated by radio transmission or other means from a central computer at the shopping facility to a receiver in the COD; and (c) a standard order of merchandise purchased, or desired to be purchased, by the customer at frequent intervals. COD 20a includes a display 22 (LEDs, LCDs or the like) for paging through information banks (b) and (c) above; a keyboard 23 or, alternatively, a voice actuated device of the type referred to previously, for entering data relating to merchandise being ordered by item identification and quantity; a further display 24 for displaying the current entry; and various control keys 25a-25e for controlling the entry operation and/or for revising information that is permanently stored to permit customization of an order, and also to permit unloading of a completed order into the facility's computer, while the customer is at the fixed purchase station.

When the customer arrives at the shopping facility he or she depresses an appropriate one of the control keys to transmit (by a transmitter included in COD 20a) a credit account number to the central computer for purposes of prequalification, i.e., credit check, and to enter the current order of items and services to be purchased. The transmitter used for this purpose may include a beam-projecting and receiving device permanently mounted on the customer's vehicle, e.g., on the windshield or visor, and plug-connectable to the COD 20a, to avoid interference with COD transmissions and/or receptions elsewhere, e.g., at other fixed purchase positions. As the customer proceeds through the timed purchase cycle additional items can be ordered by entry on the keyboard 23.

If the customer is not an owner or lessee of a portable COD the customer may prequalify for entry into the purchase cycle by inserting an appropriate credit card into a card reader or by providing pertinent credit and identification information to an attendant who may be stationed at a position preceding the facility entrance.

FIG. 3 is a partial section view of the circular building 11, showing in particular a drive means for imparting relative motion between the building and customer to realize the fixed purchase time cycle. A motor 26 is coupled to a drive wheel 27, an additional such motor and drive wheel optionally being provided in angularly spaced relation to drive 26, 27. Drive wheel 27 (or plural such wheels if plural drives are provided) engages a portion 28 of the base 11d supporting the building structure. One or more idler wheels 29 are also provided, in angularly spaced relation to the driven wheel(s), to facilitate support of the building during rotation.

The stationary roof 11a is supported in place by stanchions 11c and/or additional external columns. A stationary center column 30 is provided to supply vehicle fuel through a series of telescoping pipes (not shown) from the top of the column to distribution hoses, for each of several fuel products, that extend to each external vehicle position. Column 30 may also be used to supply water and sewage service to the building. The lower portion of column 30 passes through a stationary power transfer bus 31 which supplies power service to all rotating portions of the building.

With the foregoing shopping facility, and with those of the other embodiments to be described hereinafter, numerous advantages are realized over the types of shopping facilities that have conventionally been provided heretofore. Conventional shopping facilities require floor space to accommodate customers, and this limits inventory storage space to, e.g., 15%-25% of the total usable space in the facility. With the present facility, however, it is possible to increase inventory space to 65%-70% of the entire facility. As a result, more goods per square or cubic foot may be inventoried and sold through a facility in accordance with the present invention. Another advantage of this and other embodiments of the invention is the limited cleaning that is required, since customers do not normally have access to the interior of the facility. Moreover, the facility is secure against customer pilferage, and inventory product dating can be controlled to closer tolerances, since customers do not have physical contact with commodities within the facility at any time.

Additional savings are effected due to the reduced labor force which is required to operate a facility designed in accordance with the present invention, as compared to conventional shopping facilities. A labor cost of about 3% of the product sale price is projected for operations employing the present invention, which represents a substantial savings over facilities employing other vending techniques.

FIG. 4 illustrates an alternative embodiment of a convenience shopping facility in accordance with the present invention. In this embodiment the building itself is stationary, but is provided with a rotating roof 37 that carries a plurality of fuel hoses, one of which is depicted at 47, and a plurality of CODs and split screen monitors (not shown) for movement with the roof. A rotating ring 38 is located around the circumference of the base of the shopping facility. Ring 38 is rotatable in synchronism with rotating roof 37 at a speed of, for example, one revolution approximately every three to five minutes, constituting the fixed purchase cycle time. In the arrangement shown in FIG. 4, a vehicle entering the facility drives onto an entry tangential vehicle transporter 46 which transports the vehicle onto rotating ring 38 where it is parked tangentially on the ring adjacent to a set of the fuel hoses, a COD, and a split screen monitor each of which is supported for movement by rotating roof 37 along with the vehicle on rotating ring 38.

After the vehicle has been so parked, the purchaser goes through a timed purchase cycle of the type described previously, i.e., a fuel hose may be inserted into the vehicle as indicated at 47, orders may be entered by use of a portable COD, or the adjacent fixed COD, etc. In the course of this timed purchase cycle, ordered commodities are picked from bins 48 and placed into a tote box or gathering mechanism on a circular conveyor 49, where they are assembled. The complete order is then placed on a transverse exit conveyor 50, which is preferably separate from the circular conveyor 49 used for assembly of the order, for delivery to a fixed delivery location on the building periphery for loading into the customer's vehicle. The vehicle is thereafter transported by ring 38 onto a tangential vehicle transporter 50 for exit of the vehicle from the facility after the customer's order has been filled.

A roadway 51 located between the transporters 46 and 50 is provided for delivery vehicles, such as truck 52, to replenish heavy goods inventory in the facility. A bridge 53, which is preferably portable, is positioned to overlie rotating ring 38 to permit a delivery vehicle to park adjacent to a loading dock at the periphery of the building. Other products can be delivered into the building by a delivery vehicle such as 54 which can enter the facility in the same way as a purchaser's vehicle, and proceed through the timed cycle, during which time products can be unloaded from the truck 54 from the exterior of the building, onto shelves 55 on the interior of the building or directly into bins 48, through panels or doors (not shown) on the exterior walls of the building. The merchandise can be loaded into and removed from bins 48 manually by personnel within the building and/or commodities can be loaded into bins 48 automatically, and ordered products can be automatically removed from the bins 48 for placement on conveyors 49 and 50, under computer control, e.g., by automatic handling systems of the general types described in the U.S. Pat. Nos. to Peras 3,027,022, Cotton et al 3,504,245, Lemelson 3,519,151 and Williamson 4,237,598, appropriately modified or adapted for use in the building of the present invention.

Various exterior walls have been omitted from FIG. 4 to aid in explaining the foregoing aspects of a shopping facility constructed in accordance with the present invention. In practice, however, the building exterior of the FIG. 4 embodiment may have a visual aspect similar to that shown in FIG. 1A. The interior of the facility shown in FIG. 1A and its operation, is similar to that described in reference to FIG. 4.

In an alternative embodiment of the invention, constituting a different version of the system shown in FIG. 4, the moving transporters 46, 50 and the rotating ring 38 can be replaced by a single vehicle transporter or conveyor which extends continuously from a facility entry location, around the building, to an exit location. The timed purchase cycle is the same as that described in reference to FIG. 4. In each of the above embodiments, moreover, a mechanism can be provided to physically place a vehicle at a desired position adjacent to the building at the beginning of the timed purchase cycle, and to remove the vehicle from its parking place for exit from the facility at the end of the timed purchase cycle. The use of such a mechanism provides a means for parking the vehicles radially or at a predetermined angular orientation, rather than tangentially, relative to the building circumference during the timed purchase cycle. Such radial or angular positioning of vehicles has the advantage that more vehicles can be placed about the building at one time than is the case when the vehicles are parked tangentially.

Facilities constructed in accordance with the present invention can also include a receiving device (not shown) positioned along the entranceway to the facility which permits a customer to deposit clothes for laundering and/or drycleaning, film for processing, rented videocassettes to be returned, or any other articles to be serviced at the facility, before the customer starts the timed purchase cycle. Typically, an attendant is located adjacent to the entry of the facility who can insert a fuel delivery hose into the vehicle when the customer desires such fuel. Another attendant is typically located at the order delivery position in the facility in the case of a facility of the type described in reference to FIG. 4. In the case of a facility of the type described in reference to FIG. 1A the same attendant who originally inserted the fuel hose into the customer's vehicle at the beginning of the timed purchase cycle can be used to remove the fuel delivery hose from the customer's vehicle and to transfer ordered goods from conveyor 50 into the customer's vehicle at the end of the timed purchase cycle.

Figure 5:
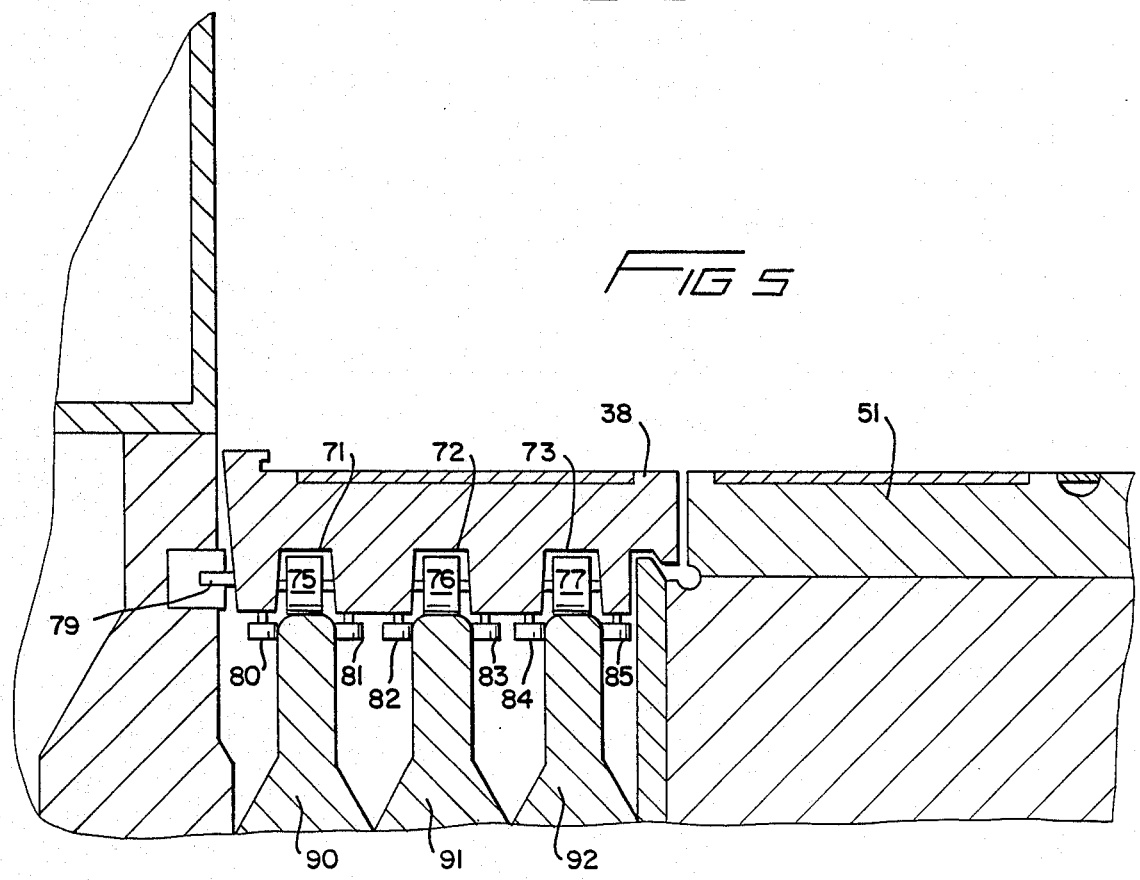
FIG. 5 is a section view of one example of a rotary track which may be utilized to impart motion to vehicles supported on the track.

FIG. 5 illustrates one possible structure for the rotating ring or track 38 which traverses the circumference of the shopping facility shown in FIG. 4, to provide the desired relative motion between a purchaser and the facility. A cast concrete track 38 is employed, having on the underside thereof a plurality of channels 71, 72 and 73 which support idler wheels 75, 76 and 77. A drive wheel 79 and associated motor impart a circumferential motion to the ring or track 38 to effect relative motion thereof with respect to the stationary portions of the facility. Additional guide wheels 80–85, maintain the idler wheels 75–77 positioned on cast supports 90, 91 and 92.

Figure 6:
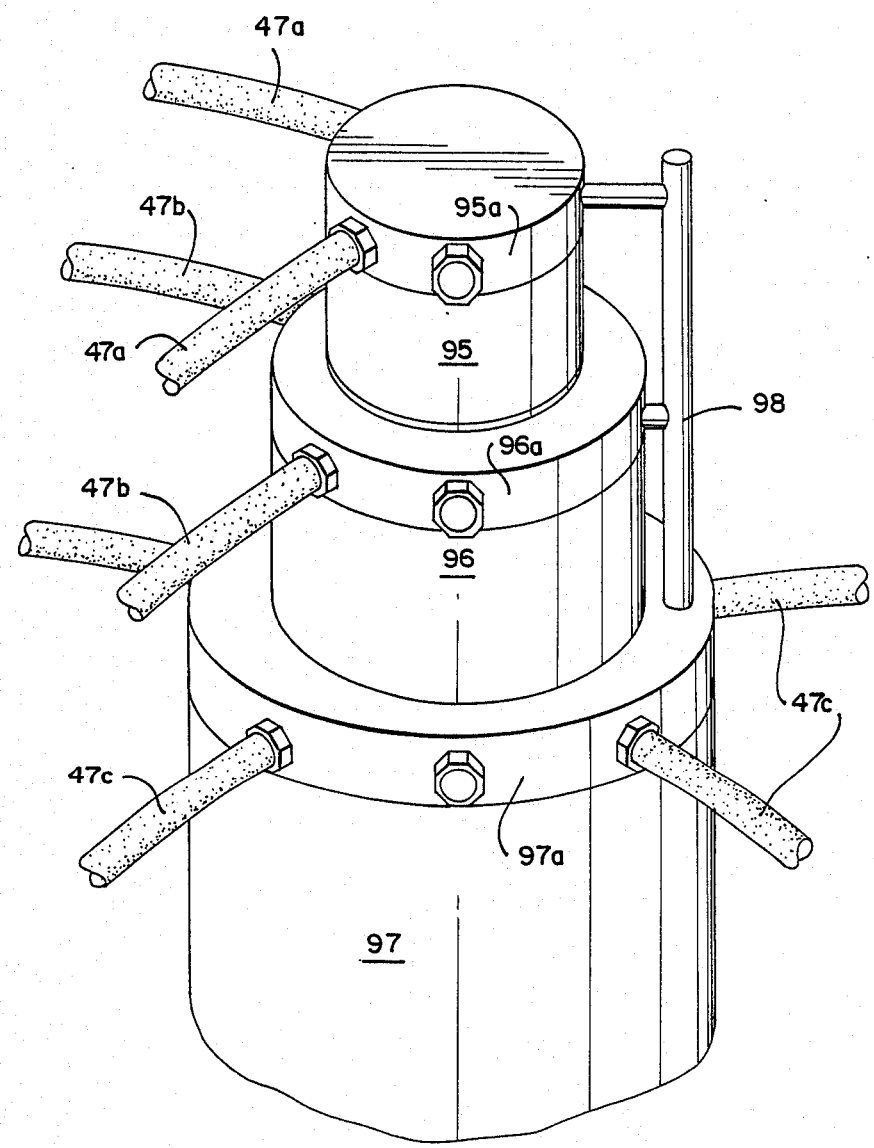
FIG. 6 diagrammatically illustrates a technique for enabling fueling hoses to remain in position relative to a moving vehicle in the FIG. 4 embodiment of the present invention.

FIG. 6 depicts an arrangement for supporting a plurality of fueling hoses at a central hub that is coaxial with and adjacent to the rotating roof of a facility such as is shown in FIG. 4, so that the hoses can rotate with each vehicle as the vehicle's fixed purchase position progresses around the circumference of the facility. The arrangement comprises a plurality of concentric, telescopically disposed stationary supply pipes 95, 96, 97 that are located within one another as illustrated, and that are respectively connected to different accessibly located tanks of fuel of different grades. The stationary pipes 95, 96 and 97 are connected respectively to rotatably mounted slip rings 95a, 96a and 97a each of which, in turn, has a plurality of fittings thereon for connection to associated fuel hoses 47a (for ring 95a), 47b (for ring 96a), and 47c (for ring 97a) which extend along or through the roof 37 (FIG. 4) of the facility to the fixed purchase positions on track 38. The several slip rings are interconnected to one another, e.g., as at 98, so that they rotate in synchronism with one another. The slip rings 95a, 96a and 97a are rotated at the same speed as the roof 37 and ring or track 38 of the facility so that the several hoses 47a, 47b and 47c rotate along with vehicles on the ring or track 38 and, in effect, remain stationary relative to the several fixed purchase positions as vehicles on the track 38 progress through their respective timed purchase cycles.

While I have thus described preferred embodiments of the present invention, many variations will be apparent to those skilled in the art. The foregoing description is accordingly intended to be illustrative only, and not limitative of the present invention, and all such variations and modifications as are in accord with the principles described are intended to fall within the scope of the appended claims.

Having thus described my invention, I claim:

1. A facility for vending vehicle fuel and consumer merchandise comprising:

a circular building for storing consumer merchandise;

first conveyor means disposed around the exterior of said building and extending from an entry location to an exit location, said first conveyor means being operative to receive vehicles at parking positions thereon and to transport each such vehicle around the exterior of said building from said entry location to said exit location in a predetermined time interval;

fuel dispensing means for delivering fuel, during said predetermined time interval, to vehicles that are located on said first conveyor means, said fuel dispensing means being mounted for movement in synchronism with the movement of said vehicles on said first conveyor means around the exterior of said building;

ordering devices accessible to the occupants of vehicles on said first conveyor means for permitting the ordering of consumer merchandise stored in said circular building; and second conveyor means located within said building for use in assembling merchandise that is ordered by the occupant of a given one of said vehicles during said predetermined time interval, said second conveyor means being operative to transport merchandise assembled within said building to a position adjacent a delivery opening in said building at a time synchronized with the time of arrival adjacent said delivery opening of the vehicle from which said assembled merchandise was ordered.

2. The facility of claim 1 wherein said first conveyor means comprises a continually moving track disposed in surrounding relation to said circular building, means adjacent said entry location for transporting a vehicle onto said moving track, and means adjacent said exit location for transporting a vehicle off of said moving track.

3. The facility of claim 1 wherein said second conveyor means includes a substantially circular conveyor that is coaxial with said circular building, said second conveyor means moving in synchronism with said first conveyor means.

4. The facility of claim 3 wherein said second conveyor means includes a linear conveyor disposed between said circular conveyor and said delivery opening in said building.

5. The facility of claim 3 including containers on said second conveyor means in which the merchandise ordered from each of said vehicles is individually assembled.

6. The facility of claim 1 wherein said ordering devices comprise a computer ordering device located within at least one of the vehicles on said first conveyor means, said computer ordering device including memory means for storing (a) customer credit account numbers to be used to pay for ordered merchandise, (b) a listing of merchandise offered for sale at the facility, and (c) a standard order of merchandise that is ordered at frequent intervals by the user of said computer ordering device, and said computer ordering device further including means for entering data relating to the identification and quantity of merchandise being ordered for delivery to the vehicle in which said computer ordering device is located.

7. The facility of claim 6 wherein said computer ordering device includes display means for displaying stored information relating to the merchandise that is offered for sale at the facility.

8. The facility of claim 6 wherein said computer ordering device includes display means for displaying identification and quantity of merchandise that has been ordered thereon.

9. The facility of claim 6 wherein said computer ordering device includes means for transmitting data, relating to the identification and quantity of merchandise that has been ordered thereon, from said computer ordering device to a receiver at said building.

10. A facility for vending vehicle fuel and consumer goods and services with increased efficiency comprising:

a circular building having an inventory of merchandise therein, said building comprising a first portion which is stationary and a roof portion which is mounted for rotational movement about said first portion;

a plurality of customer stations located on a movable track which is arranged around the exterior of said circular building, each customer station including a parking space for a single vehicle;

a plurality of merchandise ordering devices located respectively at said plurality of customer stations, each of said ordering devices being usable by a person located at an associated one of said customer stations to order merchandise from said inventory;

said stationary first portion of said circular building including at least one loading station for delivering merchandise, ordered by use of said ordering devices, to a vehicle located in a parking space adjacent to said loading station;

a plurality of fuel dispensing stations located respectively at said plurality of customer stations for fueling vehicles that are located in said parking spaces;

a plurality of merchandise displays disposed around the circumference of said circular building, said displays being viewable by persons located adjacent to said park spaces; and means for moving said track along a continuous path that is disposed in at least partially surrounding relation to said building so as to impart relative rotation between said first portion of said circular building and said customer stations thereby to cause each of said parked vehicles to move relative to said first portion of said building from a starting location parking space remote from said loading station to a finishing location adjacent said loading station in a predetermined time interval, said displays being cyclically exposed to persons at said customer stations during said time interval so that, by use of said ordering devices, a customer can select and order merchandise displayed by said displays as said relative rotation proceeds, said relative rotation being operative to successively position said loading station adjacent to each customer station for the delivery of the selected merchandise to a vehicle located adjacent to said loading station at the conclusion of said predetermined time interval.

11. The facility of claim 10 wherein each of said merchandise ordering devices includes means for inputting data identifying merchandise being ordered.

12. The facility of claim 11 wherein at least some of said merchandise ordering devices are portable computer ordering devices that are located within vehicles at said parking places.

13. The facility of claim 10 wherein said merchandise ordering devices are mounted for movement about said building in synchronism with the movement of said track.

14. The facility of claim 10 wherein said merchandise ordering devices are mounted on said rotational roof portion of said building for movement about said stationary first portion of said building in synchronism with the movement of said track.

15. The facility of claim 10 wherein said fuel dispensing stations comprise a plurality of fuel hoses mounted for movement with said rotational roof portion of said building about said stationary first portion of said building in synchronism with the movement of said track.

16. A facility for vending vehicle fuel and consumer merchandise comprising:

a circular building for storing consumer merchandise;

a continually moving conveyor track extending from an entry location around the exterior of said building to an exit location, said conveyor track having a plurality of vehicle parking positions thereon for receiving vehicles and for conveying said vehicles in succession around said building from said entry location to said exit location in a predetermined time interval;

said building comprising a stationary portion and a roof which is mounted for rotation in synchronism with the movement of said track around said stationary portion of said building;

fuel dispensing means for delivering fuel to vehicles located at each of said plurality of parking positions;

a plurality of ordering devices associated respectively with said plurality of parking positions, said ordering devices being arranged to move with said vehicle parking positions thereby to permit merchandise to be ordered from the vehicles during said predetermined time interval;

means within said building for individually assembling merchandise that is ordered from each of said vehicles respectively; and means for delivering each order of assembled merchandise to an exit opening of said building located adjacent said exit location at a time synchronized with the time of arrival at said exit location of the vehicle from which said merchandise was ordered.

17. The facility of claim 16 wherein said fuel dispensing means comprises a plurality of fuel dispensing hoses connected to a rotary joint structure which is located at approximately the axial center of said circular building adjacent to the rotating roof thereof, said hoses extending from said rotary joint structure along said rotating building roof and thence downwardly to said vehicle parking positions.

18. The facility of claim 16 wherein said ordering devices are keyboard operated merchandise ordering devices disposed respectively adjacent said plurality of vehicle parking positions.

19. The facility of claim 18 wherein said keyboard operated merchandise ordering devices are suspended from the rotating roof of said building for movement with said vehicles between said entry and exit locations.

20. The facility of claim 16 wherein said ordering devices are portable computer ordering devices that are located respectively in at least some of the vehicles at said vehicle parking positions.

21. The facility of claim 20 wherein each of said portable computer ordering devices includes memory means for storing information relating to merchandise that is offered for sale at said facility, display means for displaying said stored information, and a keyboard for entering data relating to the identification and quantity of merchandise that is being ordered by the user of said computer ordering device, said display means also being operable to display said keyboard entered data.

* * * * *